United States Patent
Yu

(10) Patent No.: US 12,367,668 B2
(45) Date of Patent: Jul. 22, 2025

(54) INFORMATION PROCESSING METHOD, INFORMATION PROCESSING DEVICE, AND ELECTRONIC DEVICE

(71) Applicant: Lenovo (Beijing) Limited, Beijing (CN)

(72) Inventor: Zhou Yu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 186 days.

(21) Appl. No.: 18/361,734

(22) Filed: Jul. 28, 2023

(65) Prior Publication Data

US 2024/0037932 A1 Feb. 1, 2024

(30) Foreign Application Priority Data

Jul. 29, 2022 (CN) .......................... 202210911885.5

(51) Int. Cl.

| | |
|---|---|
| *G06V 10/96* | (2022.01) |
| *G06T 7/11* | (2017.01) |
| *G06T 7/246* | (2017.01) |
| *G06V 10/60* | (2022.01) |
| *G06V 40/16* | (2022.01) |
| *H04N 23/611* | (2023.01) |
| *H04N 23/65* | (2023.01) |

(52) U.S. Cl.
CPC ............... *G06V 10/96* (2022.01); *G06T 7/11* (2017.01); *G06T 7/248* (2017.01); *G06V 10/60* (2022.01); *H04N 23/611* (2023.01); *H04N 23/651* (2023.01); *G06T 2207/20021* (2013.01); *G06T 2207/30201* (2013.01); *G06V 40/167* (2022.01)

(58) Field of Classification Search
CPC ...... G06V 10/96; G06V 10/60; G06V 40/167; G06V 40/161; G06V 40/166; G06T 7/11; G06T 7/248; G06T 2207/20021; G06T 2207/30201; H04N 23/611; H04N 23/651; H04N 23/60; H04N 23/71; H04N 23/76; G06F 9/4418
See application file for complete search history.

(56) References Cited

U.S. PATENT DOCUMENTS

| | | | | |
|---|---|---|---|---|
| 6,072,903 A | * | 6/2000 | Maki | ....................... G06T 7/251 |
| | | | | 348/169 |
| 7,302,086 B2 | * | 11/2007 | Funayama | .............. G10L 15/25 |
| | | | | 382/116 |

(Continued)

*Primary Examiner* — Chiawei Chen
(74) *Attorney, Agent, or Firm* — ANOVA LAW GROUP, PLLC

(57) ABSTRACT

An information processing method, applied to an electronic device including an object detection unit and a control unit, comprising determining that a target object is detected. The object detection unit sends a status switch instruction to the control unit and controls the object detection unit to switch from a first status to a second status, and the status switch instruction is used to cause the electronic device to switch from a third status to a fourth status. The method further includes determining that the object detection unit enters the second status. In response to a control instruction sent by the control unit, the object detection unit obtains an object feature of the target object to cause the electronic device to perform recognition on the target object based on the object feature.

20 Claims, 4 Drawing Sheets

---

Determine that a target object is detected, send a state switch instruction by an object detection unit to the control unit, and control the object detection unit to switch to a second status from a first status — S101

Determine that the object detection unit enters the second status, and in response to the control instruction sent by the control unit, obtain object features of the target object by the object detection unit to cause the electronic device to perform recognition on the target object based on the object features — S102

(56) References Cited

U.S. PATENT DOCUMENTS

| | | | | |
|---|---|---|---|---|
| 7,925,053 | B2* | 4/2011 | Altherr | G06T 7/246 |
| | | | | 348/208.99 |
| 8,649,565 | B1* | 2/2014 | Kim | G06F 18/2111 |
| | | | | 382/106 |
| 9,253,410 | B2* | 2/2016 | Tsubusaki | H04N 23/611 |
| 2007/0130599 | A1* | 6/2007 | Monroe | H04B 7/18506 |
| | | | | 348/E7.086 |
| 2013/0188045 | A1* | 7/2013 | Kalevo | G06V 20/52 |
| | | | | 348/143 |
| 2013/0250078 | A1* | 9/2013 | Levy | G01C 21/20 |
| | | | | 348/62 |
| 2014/0028713 | A1* | 1/2014 | Keating | G06T 19/006 |
| | | | | 345/633 |
| 2014/0211988 | A1* | 7/2014 | Fan | G06V 20/52 |
| | | | | 382/103 |
| 2016/0012597 | A1* | 1/2016 | Wnuk | G06T 7/246 |
| | | | | 382/103 |
| 2016/0165134 | A1* | 6/2016 | Lelescu | G06T 3/4069 |
| | | | | 348/218.1 |
| 2016/0306264 | A1* | 10/2016 | Chu | F16M 13/04 |
| 2017/0006219 | A1* | 1/2017 | Adsumilli | H04N 23/90 |
| 2017/0124691 | A1* | 5/2017 | Zavesky | G06T 7/40 |
| 2018/0101744 | A1* | 4/2018 | Bar-Nahum | G06V 20/13 |
| 2018/0150974 | A1* | 5/2018 | Abe | G06T 7/74 |
| 2020/0074673 | A1* | 3/2020 | Gupta | G06F 18/214 |
| 2021/0334937 | A1* | 10/2021 | Afsham | G06T 3/4046 |
| 2022/0148253 | A1* | 5/2022 | Sanders | G06T 15/005 |
| 2023/0005239 | A1* | 1/2023 | Xu | G06V 10/25 |
| 2024/0312037 | A1* | 9/2024 | Fukunaga | G06T 7/579 |

* cited by examiner

| 3 | 2 | 1 | 2 | 3 |
|---|---|---|---|---|
| 2 | 1 | 1 | 1 | 2 |
| 2 | 1 | 1 | 1 | 2 |
| 2 | 2 | 1 | 1 | 2 |
| 2 | 2 | 1 | 1 | 1 |
| 2 | 2 | 1 | 1 | 1 |
| 1 | 1 | 1 | 1 | 1 |
| 1 | 2 | 1 | 1 | 1 |

INFORMATION PROCESSING METHOD, INFORMATION PROCESSING DEVICE, AND ELECTRONIC DEVICE

CROSS-REFERENCE TO RELATED APPLICATION

The present disclosure claims priority to Chinese Patent Application No. 202210911885.5, filed on Jul. 29, 2022, the entire content of which is incorporated herein by reference.

TECHNICAL FIELD

The present disclosure relates to the information processing technology field and, more particularly, to an information processing method, an information processing device, and an electronic device.

BACKGROUND

In an information processing method of an electronic device, an image acquisition apparatus can be woken after an apparatus system responds. A certain time is needed for waking the image acquisition apparatus. Thus, device processing time is extended, and device start efficiency is low.

SUMMARY

Embodiments of the present disclosure provide an information processing method, applied to an electronic device including an object detection unit and a control unit, comprising determining that a target object is detected. The object detection unit sends a status switch instruction to the control unit and controls the object detection unit to switch from a first status to a second status, and the status switch instruction is used to cause the electronic device to switch from a third status to a fourth status. The method further includes determining that the object detection unit enters the second status. In response to a control instruction sent by the control unit, the object detection unit obtains an object feature of the target object to cause the electronic device to perform recognition on the target object based on the object feature.

Embodiments of the present disclosure provide an information processing device, including an object detection unit and a control unit. The object detection unit is configured to determine that a target object is detected, send a status switch instruction to the control unit, and control the object detection unit to switch from a first status to a second status. The status switch instruction is used to cause an electronic device to switch from a third status to a fourth status. The control unit is configured to send a control instruction to the object detection unit. The object detection unit is further configured to determine that the object detection unit enters the second status, and in response to the control instruction sent by the control unit, obtain an object feature of the target object to cause the electronic device to perform recognition on the target object based on the object feature.

Embodiments of the present disclosure provide an electronic device, including one or more processors and one or more memories. The one or more memories store executable information processing instructions that, when executed by the one or more processors, cause the one or more processors to determine that a target object is detected, send a status switch instruction, and control an object detection unit to switch from a first status to a second status, determine that the object detection unit enters the second status, and in response to a control instruction, obtain an object feature of the target object to cause the electronic device to perform recognition on the target object based on the object feature. The status switch instruction is used to cause the electronic device to switch from a third status to a fourth status.

DETAILED DESCRIPTION OF THE EMBODIMENTS

The technical solutions of embodiments of the present disclosure are described in detail below in connection with the accompanying drawings of embodiments of the present disclosure.

To cause the purposes, technical solutions, and advantages of the present disclosure to be clear, the present disclosure is described in detail below in connection with the accompanying drawings. Described embodiments are only some embodiments of the present disclosure and not all embodiments. All other embodiments obtained by those skilled in the art based on embodiments in the present disclosure without creative efforts should be within the scope of the present disclosure.

In the following description, "some embodiments/some other embodiments" involved describe a sub-set of all possible embodiments. "Some embodiments/some other embodiments" can be a same sub-set or different sub-sets of all possible embodiments, which can be combined when there is no conflict.

Unless otherwise defined, all technical and scientific terms of the present disclosure have the same meaning as commonly understood by those skilled in the. The terminology used in the present disclosure is only for the purpose of describing embodiments of the present disclosure and is not intended to limit the scope of the present disclosure.

Figure 1:
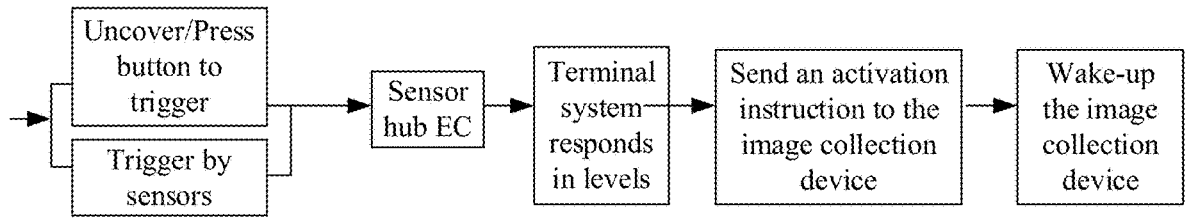
FIG. 1 illustrates a schematic diagram showing a time sequence of an information processing method according to some embodiments of the present disclosure.

FIG. 1 illustrates a schematic diagram showing a time sequence of an information processing method according to some embodiments of the present disclosure. By triggering a terminal system through a manner such as opening a cover or pressing a button, a sensor instruction set (Sensor hub EC) is sent to the terminal system. After receiving the Sensor hub EC, the terminal system responds in levels. For example, the terminal system starts to operate from sleep, and members of the terminal system (screen, memory, etc.) can be woken from a power-saving state or a low battery state. After the terminal system responds in levels, the terminal system sends a wake-up instruction to an image acquisition unit (e.g., a camera integrated into the terminal system). After the image acquisition unit is woken-up, a face detection is performed on the terminal system to realize an operation such as login. Thus, in the information processing method, time is spent on waking-up the image acquisition unit, and the response time of the information processing response time is extended, which reduces user experience.

Figure 2:
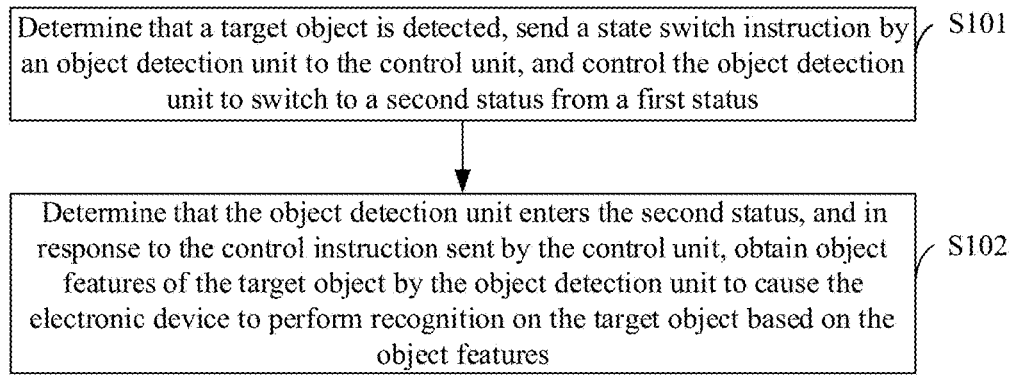
FIG. 2 illustrates a schematic diagram showing an interaction process of an information processing method according to some embodiments of the present disclosure.

Based on the problem of the technical solution, embodiments of the present disclosure provide an information processing method. The method can be applied to an electronic device. The electronic device can include an object detection unit and a control unit. The electronic device can be a laptop computer, a tablet computer, a cell phone, etc. In the information processing method of embodiments of the present disclosure, the processing time of the electronic device can be shortened to improve the user experience. FIG. 2 illustrates a schematic diagram showing an interaction process of an information processing method according to some embodiments of the present disclosure. The method includes the following steps.

At S101, a target object being detected is determined. An object detection unit sends a state switch instruction to the control unit, and the object detection unit is controlled to switch to a second status from a first status.

The object detection unit can be an image collection device such as a recorder, a camera, or an infrared sensor such as a Time-of-Flight (TOF) sensor. The control unit can be a processing unit of the electronic device. The control unit can include a first processing unit and a second processing unit. The first processing unit can be configured to receive the status switch instruction sent by the object detection unit and respond to the status switch instruction to start the electronic device. The second processing unit can be a central processing unit (CPU) of the electronic device and can be configured to send a control instruction to the object detection unit and control the status of the object detection unit. In some other embodiments, the first processing unit and the second processing unit are not differentiated. That is, the first processing unit and the second processing unit can be configured to receive the status switch instruction sent by the object detection unit and can also be used as the CPU of the electronic device to send the control instruction to the object detection unit and control the status of the object detection unit.

In some embodiments, the status switch instruction can be used to cause the electronic device to switch from a third status to a fourth status. In some embodiments, the first status and the third status can have same features, e.g., both being a low power status. However, the third status can be a sleep or hibernation status of the electronic device. Similarly, the second status and the fourth status can also have same features, such as both being a high power status. In practical applications, the power consumption of the object detection unit in the second status can be higher than the power consumption of the object detection unit in the first status. The power consumption of the electronic device in the fourth status can be higher than the power consumption of the electronic device in the third status. The electronic device being switched from the third status to the fourth status can include the electronic device entering a fully activated status from a sleep or hibernation status.

In some embodiments, the target object can be a person or a face located within a predetermined range around the electronic device. When the object detection unit detects the target object, the object detection unit can be switched from a first status to a second status. Meanwhile, the object detection unit can send a status switch instruction to the electronic device to notify the electronic device that the target object has been detected causing the electronic device to enter the fourth status from the third status.

At S102, the object detection unit is determined to have entered the second status, and in response to the control instruction sent by the control unit, the object detection unit obtains object features of the target object to cause the electronic device to perform recognition on the target object based on the object features.

In some embodiments, when the object detection unit is determined to have entered the second status, and the object detection unit receives the control instruction sent by the electronic device, the object detection unit can obtain the image frame corresponding to the target object and the object feature of the target object in the image frame. Then, the image frame can be sent to the control unit of the electronic device (i.e., CPU) to cause the control unit of the electronic device to perform recognition on the target object based on the object features.

In some embodiments, after successfully recognizing the target object, the user can log in to the electronic device. In some other embodiments, after successfully recognizing the target object, the electronic device can perform a predetermined operation, for example, when the object detection unit enters the second status, the electronic device can be in a status before logging into the electronic device or an working status after log into the electronic device. If the electronic device is in the working status, after the target object is successfully recognized, an application of the electronic device can be started, or a payment function can be realized.

In some embodiments, after the object detection unit is determined to have entered the second status, the object detection unit may wait for the control unit to send the control instruction and activate the timer to start timing. If the object detection unit does not receive the control instruction sent from the control unit when a timed time length reaches a predetermined time length, the object detection unit can be controlled to enter the first status from the second status. That is, the object detection unit can be controlled to enter the power-saving status from a high power status to reduce the power consumption of the electronic device.

Embodiments of the present disclosure provide an information processing method, an information processing device, and an electronic device, which adopt the technical solution of the present disclosure. First, the target object can be determined to have been detected. The object detection unit can send the status switch instruction to the control unit, and the object detection unit can be controlled to switch from the first status to the second status. The status switch instruction can cause the electronic device to switch from the third status to the fourth status. Then, the object detection unit can be determined to have entered the second status. In response to the control instruction sent by the control unit, the object detection unit can obtain the object feature of the target object. Thus, the electronic device can perform recognition on the target object based on the object feature. As such, when the target object is determined to have been detected, the status switch instruction can be sent to the control unit. Meanwhile, the object detection unit can be switched to the second status from the first status, which shortens the time for waking up the object detection unit. After the object detection unit enters the second status and received the control instruction of the control unit, the object detection unit can directly obtain the object feature of the target object, which saves the time for adjusting the collection parameters of the object detection unit. Thus, the overall processing time of the electronic device can be shortened, which improves the start efficiency of the electronic device.

In some embodiments of the present disclosure, if the object detection unit does not detect the target object within the predetermined time, the object detection unit can be controlled to stop working and enter a status with lower power consumption compared to the first status from the first status, for example, a non-working status or fully shut-down status, which prevents the object detection unit from being always in a power consumption status to reduce the power consumption of the electronic device. Then, the object detection unit can perform detection on an object within a predetermined range around the electronic device at every predetermined time length. By performing the detection on the object within the predetermined range around the electronic device every predetermined time length, missing the target object within the predetermined range around the electronic device can be avoided. Meanwhile, the power consumption of the electronic device can be also lowered.

In some embodiments, after the object detection unit performs the detection on the object within the predetermined range around the electronic device every predetermined time length, if the object detection unit is determined to have detected the target object, the object detection unit can send the status switch instruction to the control unit, and the object detection unit can be controlled to switch from the first status to the second status, e.g., from the power-saving status to the high power status. Meanwhile, the status switch instruction can cause the electronic device to be switched from the third status to the fourth status. For example, the status switch instruction can be used to control the electronic device to enter the high power status from the power-saving status. In some embodiments, after the object detection unit enters the second status, the target collection parameter corresponding to the target object can be determined. After the electronic device enters the fourth status, the electronic device can perform the recognition on the target image frame corresponding to the target object obtained based on the target collection parameter, and the electronic device can be logged in after successful recognition.

In some embodiments of the present disclosure, before the target object is determined to have been detected, step S201 and step S202 can be performed.

At S201, the object detection unit is determined to be currently in the first status and performs detection on the object within the predetermined range around the electronic device.

The first status can include the object detection unit being in the power-saving status. For example, the object detection unit can be a recorder. When the recorder is in the first status, a part of and not all of the photosensitive units can be in the working status. The recorder can be configured to collect a human object within the predetermined range around the electronic device to obtain one or more image frames. The pixel resolution of the image frame can be lower than the pixel resolution of the image collected when all the photosensitive units of the recorder work. When the object detection unit is the TOF sensor, the TOF sensor can emit an infrared light pulse wave to the predetermined range around the electronic device, which can be reflected after the infrared light pulse wave encounters the human object. The reflected infrared light pulse wave can be collected by the TOF sensor. Thus, the detection of the object within the predetermined range of the electronic device can be realized.

At S202, the target object detected within the predetermined range around the electronic device is determined, the status switch instruction is sent to the control unit, and the object detection unit is controlled to enter the second status from the first status.

In some embodiments, when the object detection unit detects the target object within the predetermined range around the electronic device, for example, a human face that meets a face detection requirement is detected, the object detection unit can send the status switch instruction to the control unit. Meanwhile, the object detection unit can be controlled to enter the second status from the first status.

In embodiments of the present disclosure, when the object detection unit is in the first status, the object detection unit starts to perform the detection on the object within the predetermined range around the electronic device. When the target object is detected, the status switch instruction can be sent to the control unit to cause the electronic device to enter the fourth status from the third status. The wake-up instruction can be sent to the object detection unit not after the electronic device enters the fourth status. The object detection unit can be activated to perform the detection on the target object, which shortens the time for activating the object detection unit and reduces the wait time of the user. Thus, the start efficiency of the electronic device can be improved.

In some embodiments of the present disclosure, after the object detection unit is determined to have entered the second status, step S401 to step S404 can be performed.

At S401, the object detection unit determines the target collection parameter corresponding to the target object.

In some embodiments, the collection parameter can include an exposure value and sensitivity of the object detection unit when collecting the image frame corresponding to the target object. Accordingly, the target collection parameter can be the exposure value and sensitivity of the object detection unit when collecting the image frame that meets the face detection requirement. After the object detection unit enters the second status, the target collection parameter of the target object can be determined.

At S402, the target image frame corresponding to the target object is collected based on the target collection parameter.

In some embodiments, after the target collection parameter is determined, the object detection unit can perform the collection on the image frame of the target object based on the target collection parameter. For example, when the target collection parameter is an exposure value, the object detection unit can perform the collection on the target object based on the exposure value to obtain the target image frame. The brightness of the target image frame can meet the brightness required for the face detection.

At S403, the object detection unit sends the target image frame to the control unit.

In some embodiments, after the object detection unit obtains the target image frame, the object detection unit can send the obtained target image frame to the control unit. The control unit can be the CPU of the electronic device.

At S404, the control unit can obtain the object feature of the target object from the target image frame, perform the recognition on the target object based on the object feature, and allow login to the electronic device after the successful recognition.

In some embodiments, after obtaining the target image frame sent by the object detection unit, the control unit can perform feature extraction on the target image frame to obtain the object feature of the target object. Based on the object feature, the control unit can adopt a face detection algorithm to perform the recognition on the target object and allow login to the electronic device after the successful recognition.

After the object detection unit enters the second status, the target collection parameter can be determined. The object detection unit can be configured to collect the target image frame corresponding to the target object based on the parameter value and send the target image frame to the control unit after receiving the control instruction sent by the control unit. The control unit can then perform the recognition on the target object based on the received target image frame and allow login to the electronic device after the successful recognition.

In some embodiments, the target collection parameter corresponding to the target object can be determined based on the image frame obtained when the object detection unit is in the first status. For example, the target collection parameter can be determined according to the feature value of the image frame obtained when the target detection unit is in the first status. The feature value can be the brightness of the image frame obtained when the object detection unit is in the first status. In practical applications, when the object detection unit is a recorder, the recorder can collect one or more image frames in the first status, e.g., the power-saving status. After obtaining the one or more image frames, the feature values of the image frames can be further determined. The target collection parameter of the target object can be determined according to the feature values of the image frames.

In some embodiments, when the object detection unit is a recorder, the collection parameter corresponding to the target object can be the exposure value corresponding to the recorder. Thus, the target collection parameter corresponding to the target object can be the target exposure value corresponding to the recorder. After the target exposure value is obtained, the image frame corresponding to the target object can be collected based on the target exposure value.

In some embodiments of the present disclosure, the object detection unit can determine the target collection parameters corresponding to the target object. That is, step S401 can be implemented by step S4011 to step S4014.

At S4011, the object detection unit collects an initial image frame corresponding to the target object and determines the initial image feature value corresponding to the object detection unit when collecting the initial image frame.

The object detection unit can be a recorder. The initial image frame can include a first or first several image frames corresponding to the target object collected by the object detection unit in the first status or the image frame corresponding to the target object collected by the object detection unit at a first time. The initial image feature value can be the initial sensitivity corresponding to the object detection unit when capturing the initial image frame corresponding to the target object. In some embodiments, after the object detection unit obtains the initial image frame corresponding to the target object, the initial image feature value corresponding to the object detection unit can be further determined when collecting the initial image frame.

At S4012, the feature value corresponding to the initial image frame is determined, and the target scene corresponding to the target object in the initial image frame is determined based on the feature value.

In some embodiments, the feature value can be the brightness of the image. The target scene can include a backlight infrared scene (e.g., facing away from the window), a front light infrared scene (e.g., facing the window), an indoor artificial light source, or an indoor darkness in which the current target object is located. or other scenes. In practical applications, the initial image frame can include a plurality of image blocks with different brightness values. The target scene corresponding to the initial image frame can be determined according to the brightness values of the image blocks and the variation information of the brightness values.

At S4013, a target image feature gain value corresponding to the target scene is determined based on the correspondence between the scene and the image feature gain value.

In some embodiments, if the object detection unit is a recorder, and the recorder does not actively emit infrared light, the scene where the target object is can be the infrared light in a natural environment or objective environment. The scene can include backlight infrared, front light infrared, indoor artificial light source, indoor darkness, and other scenes. The image feature gain value can be a brightness gain value. The correspondence between the scene and the image feature gain value can be pre-set. As an example, Table 1 shows a correspondence between the scene and the image feature gain value of embodiments of the present disclosure.

TABLE 1

| Correspondence between scene and image feature gain value | | | | | |
|---|---|---|---|---|---|
| Scene | Back-light infrared | Front light infrared | Indoor artificial light source | Indoor darkness | Other scenes |
| Image feature gain value | 1200 | 600 | 300 | 1 | Pre-set value |

In Table 1, when the target object is in different scenes such as backlight infrared, front light infrared, indoor artificial light source, indoor darkness, and other scenes, the corresponding image feature gain values can be 1200, 600, 300, 1, and a preset value, respectively. In some embodiments, the other scenes can include various infrared light sources. For example, the other scenes can be a combination of the backlight infrared and the indoor artificial light source. That is, the current scene where the target object is can include an outdoor infrared source and an indoor infrared source. Thus, the pre-set value corresponding to the other scenes can be any value ranging from 300 to 600. For example, the pre-set value can be 400, 500, etc.

In some embodiments, after the target scene corresponding to the initial image frame is obtained, the image feature gain value corresponding to the target scene, i.e., the target image feature gain value, can be determined based on the correspondence between the scene and the image feature gain value.

At S4014, the target image feature value is determined based on the initial image feature value and the target image feature gain value. The target image feature value is determined as the target collection parameter corresponding to the target object.

In some embodiments, the initial image feature value can be the initial sensitivity when the object detection unit collects the initial image frame. The target image feature gain value can be a parameter related to the image brightness. Thus, the target image feature value can be the target sensitivity corresponding to the object detection unit. In practical applications, the multiple corresponding to the image feature gain value can be increased based on the initial sensitivity corresponding to the object detection unit to obtain the target sensitivity. The brightness value of the image frame collected based on the target sensitivity can be greater than the brightness value of the image frame collected based on the initial sensitivity. Moreover, the brightness value of the image frame collected based on the target sensitivity can conform to the image brightness value required by face detection. After the target image feature value is determined, the target image feature value can be determined as the target collection parameter corresponding to the target object. Further, the image frame corresponding to the target object can be collected according to the target collection parameter to obtain the image required by face detection.

In some embodiments of the present disclosure, by collecting the initial image frame corresponding to the target object when the object detection unit is in the first status, the initial image feature value corresponding to the object detection unit can be determined when collecting the initial image frame, and the target scene corresponding to the target object can be determined according to the feature value corresponding to the initial image frame. Further, the target image feature gain value corresponding to the target scene can be determined according to the correspondence between the scene and the image feature gain value, and the target image feature value can be determined based on the target image feature gain value and the initial image feature value, that is, the target collection parameter corresponding to the target object. Thus, the collection parameter of the image required by face detection can be obtained quickly, which shortens the time for obtaining the image frame required by face detection.

In some embodiments of the present disclosure, the feature value corresponding to the initial image frame can be determined, and the target scene corresponding to the target object in the initial image frame can be determined based on the feature value. That is, step S4012 can also be implemented by step S501 to step S504.

At S501, the initial image frame is divided to obtain at least two image blocks, and region feature values corresponding to the image blocks are determined.

A region feature value can be the brightness value corresponding to an image block. In some embodiments, a plurality of regions with varying brightness can exist in the initial image frame. Thus, the initial image frame can be divided to obtain a plurality of image blocks. A number of image blocks corresponding to the initial image frame can be pre-determined, such as 100, 160, 200, etc.

In practical applications, an image block can include a plurality of pixel points. The brightness corresponding to the image block can be determined according to the pixel values corresponding to the pixel points in the image block. For example, if the image block includes 10 pixel points, the brightness value corresponding to the image block can be determined as an average value of the pixel values of the 10 pixel points.

At S502, feature levels corresponding to the image blocks are determined based on the region feature values of the image blocks.

In some embodiments, when the region feature values are the brightness values corresponding to the image blocks, the feature levels can be the brightness levels. The brightness levels can be used to represent bright-dark levels of the image blocks. For example, the brightness levels can be set as level 1, level 2, level 3, and level 4. Level 1 can represent a dark image, level 2 can represent a relatively dark image, level 3 can represent a relatively bright image, and level 4 can represent a bright image.

In some embodiments, after the region feature values of the region blocks are determined, the feature levels corresponding to the image blocks can be determined according to the predetermined correspondence between the region feature value range and the feature levels. For example, if the region feature value represents the brightness value corresponding to the image block, and the feature level represents the brightness level, the correspondence between the region feature value range and the feature levels can include that brightness range [0, 90) corresponds to brightness level 1, brightness range [90, 150) corresponds to brightness level 2, brightness range [150, 200) corresponds to brightness level 3, and brightness range [200, 256] corresponds to brightness level 4.

Figures 3, 4:
FIG. 3 illustrates a schematic diagram of an initial image frame obtained by a second detection unit according to some embodiments of the present disclosure.
FIG. 4 illustrates a schematic diagram showing a brightness level corresponding to image blocks of an initial image frame according to some embodiments of the present disclosure.

For example, FIG. 3 illustrates a schematic diagram of an initial image frame obtained by the object detection unit according to some embodiments of the present disclosure. The image frame is divided to obtain 40 image blocks shown in FIG. 4. The feature levels of the image blocks are shown in FIG. 4. 1, 2, and 3 in FIG. 4 represent the brightness levels. 1 represents a dark image, 2 represents a relatively bright image, and 3 represents a bright image.

At S503, the feature variation information of the initial image frame is determined based on the feature levels corresponding to the image blocks.

In some embodiments, after the feature levels corresponding to the image blocks are determined, the feature variation information of the initial image frame can be determined according to the variation information of the feature levels. In practical applications, if the feature levels are the brightness levels, the feature variation information can be the brightness variation information in the initial image frame. The brightness variation information can include from dark to bright, from bright to dark, etc., which can reflect the changes in the brightness details in the initial image frame.

At S504, the target scene corresponding to the target object is determined in the initial image frame based on the feature variation information.

In some embodiments, after obtaining the feature variation information corresponding to the initial image frame, the target scene corresponding to the target object in the initial image frame can be determined based on the feature variation information. In practical applications, the correspondence between pre-set feature variation information and pre-set scenes can be pre-obtained. After the feature variation information is determined, the target scene corresponding to the feature variation information can be determined according to the correspondence between the pre-set feature variation information and the pre-set scene. For example, according to the feature levels corresponding to the image blocks shown in FIG. 4, the target scene corresponding to the target object in the initial image frame (FIG. 3) corresponding to the image blocks can be the backlight infrared scene.

In some embodiments of the present disclosure, the plurality of image blocks can be obtained by dividing the initial image frame. The feature levels corresponding to the image blocks can be determined based on the region features corresponding to the image blocks, the feature variation information of the initial image frame can be determined according to the feature levels, and the scene where the target object is can be determined based on the feature variation information of the initial image frame. By dividing the initial image frame, the corresponding variation information can be determined according to the feature levels of the image blocks obtained after dividing the initial image frame. The target scene of the target object in the initial image frame can be determined according to the variation information to improve the initial image recognition efficiency.

In some embodiments of the present disclosure, determining that the target object is detected can also be implemented by step S601 to step S604.

At S601, the first object having a distance to the electronic device smaller than a first distance threshold is determined, and at least two first image frames corresponding to the first object are obtained.

The first distance threshold can be a pre-determined distance threshold, and the first object can be a human object. If a human object is detected within the first distance threshold to the electronic device, the human object can be determined to be the first object, which indicates that a person approaches the electronic device. The image collection can be performed on the first object to obtain the image frame corresponding to the first object, i.e., the first image frame. In some embodiments, the number of the collected first image frames corresponding to the first object can be two or more. The first image frames can be image frames collected when the object detection unit is in the first status.

At S602, the distance between the first object and the electronic device is determined, and timestamps corresponding to the first image frames are determined when the first image frames are collected.

In some embodiments, after obtaining the plurality of first image frames, the distance between the first object and the electronic device and the timestamps corresponding to the first image frames can be further determined when the second timestamps are collected. That is, the distance information of the first object corresponding to the first image frames can be obtained, and the time information of the first image frames can be obtained.

At S603, the distances are arranged in ascending order according to the timestamps of the first image frames corresponding to the distances to obtain an arrangement result corresponding to the distances.

In some embodiments, the distances between the first object and the electronic device can be arranged in an ascending order when the first image frames are collected according to the sequence of the timestamps of the first image frames to obtain the arrangement result corresponding to the distances. For example, if three first image frames are collected, the sequence corresponding to the timestamps of the three first image frames can be a first first image frame, a second first image frame, and a third first image frame. The distance to the electronic device can be 5 m when the first first image frame is collected. The distance to the electronic device can be 2 m when the second first image frame is collected. The distance to the electronic device can be 1 m when the third first image frame is collected. The arrangement result of the distances can be 5, 2, and 1.

At S604, the distances are determined to change according to a pre-determined rule based on the arrangement result, and the first distance is smaller than or equal to a second distance threshold, and the target object is determined to have been detected.

The pre-determined rule can include that the distances change in a descending order. The second distance threshold can be a predetermined distance value. The second distance threshold can be smaller than the first distance threshold. The first distance can be a last distance in the arrangement result.

In some embodiments, if the arrangement result indicates that the distances change according to the predetermined rule and the last distance of the distances is less than or equal to the second distance threshold, it indicates that the target object is detected. That is, the first object is determined as the target object.

In other embodiments, if the first distance in the arrangement result is determined to be greater than the last distance in the arrangement result, and the last distance is less than or equal to the second distance threshold. That is, the distances of the arrangement result may not necessarily change in the sequence from large to small, for example, from small to large, then from large to small. Thus, as long as the last distance is smaller than or equal to the second distance threshold, and the last distance is smaller than the first distance, the first object can be determined to approach the electronic device. The first object can be determined as the target object.

In some embodiments of the present disclosure, by obtaining the distances between the first object and the electronic device when the first image frames are collected, the distances can be arranged in the ascending order according to the sequence of the timestamps corresponding to the first image frames, the arrangement result of the distances can be obtained. According to whether the arrangement result changes according to the pre-determined rule or a size relationship between the first distance and the last distance in the arrangement result, and whether the last distance is smaller than or equal to the second threshold value, whether the first object moving around the electronic device is the target object that needs to activate the electronic device can be accurately determined.

In some embodiments of the present disclosure, the object detection unit can further include a first detection unit and a second detection unit. Based on this, the object detection unit sending the status switch instruction to the control unit, and controlling the object detection unit to switch from the first status to the second status can be implemented in step S301A.

At S301A, the first detection unit is determined to have detected the target object. The first detection unit sends the status switch instruction to the control unit and controls the second detection unit to switch from the first status to the second status.

In some embodiments, the first detection unit can be an infrared sensor, such as a TOF sensor. The second detection unit can be a recorder, such as an RGB camera or an infrared recorder. In practical applications, the first detection unit can be configured to detect an object within the predetermined range around the electronic device. When the target object is determined to have been detected, the first detection unit can send the status switch instruction to the control unit of the electronic device, and meanwhile, control the second detection unit to switch from the first status to the second status.

After the second detection unit enters the second status, the second detection unit can collect the image frames corresponding to the target object.

In other embodiments, the object detection unit can only include the second detection unit. Based on this, the object detection unit sending the status switch instruction to the control unit, and controlling the object detection unit to switch from the first status to the second status can be implemented in step S301B.

At S301B, the second detection unit is determined to have detected the target object, the second detection unit sends the status switch instruction to the control unit, and the second detection unit is controlled to switch from the first status to the second status.

In some embodiments, when the object detection unit may only include the second detection unit, the second detection unit can be an infrared recorder or an RGB recorder. The second detection unit can be configured to perform image collection on the object within the predetermined range around the electronic device and perform feature analysis on the collected image. When the collected image is determined to have a human feature, the target object can be determined to have been detected. Then, the second detection unit can send the status switch instruction to the control unit. Meanwhile, the second detection unit can be controlled to switch from the first status to the second status.

In some embodiments, after the second detection unit enters the second status, the image frame corresponding to the target object can be collected. The analysis can be performed on the image frame corresponding to the target object to determine the collection parameter corresponding to the target object.

In embodiments of the present disclosure, first, the target object can be determined to have been detected. The object detection unit can send the status switch instruction to the control unit. The object detection unit can be controlled to switch from the first status to the second status. The status switch instruction can be used to cause the electronic device to switch from the third status to the fourth status. Then, the object detection unit can be determined to enter the second status. In response to the control unit sending the control instruction, the object detection unit can obtain the object feature of the target object to cause the electronic device to perform recognition on the target object based on the object feature. As such, when the target object is determined to have been detected, the status switch instruction can be sent to the control unit. Meanwhile, the object detection unit can be switched from the first status to the second status, which shortens the time for waking up the object detection unit. After the object detection unit enters the second status and receives the control instruction of the control unit, the object detection unit can directly obtain the object feature of the target object, which saves time for the object detection unit to adjust the collection parameter. Thus, the overall processing time of the electronic device can be shortened, and the start efficiency of the electronic device can be improved.

An implementation process of embodiments of the present disclosure in actual application scenes is described below.

Figure 5:
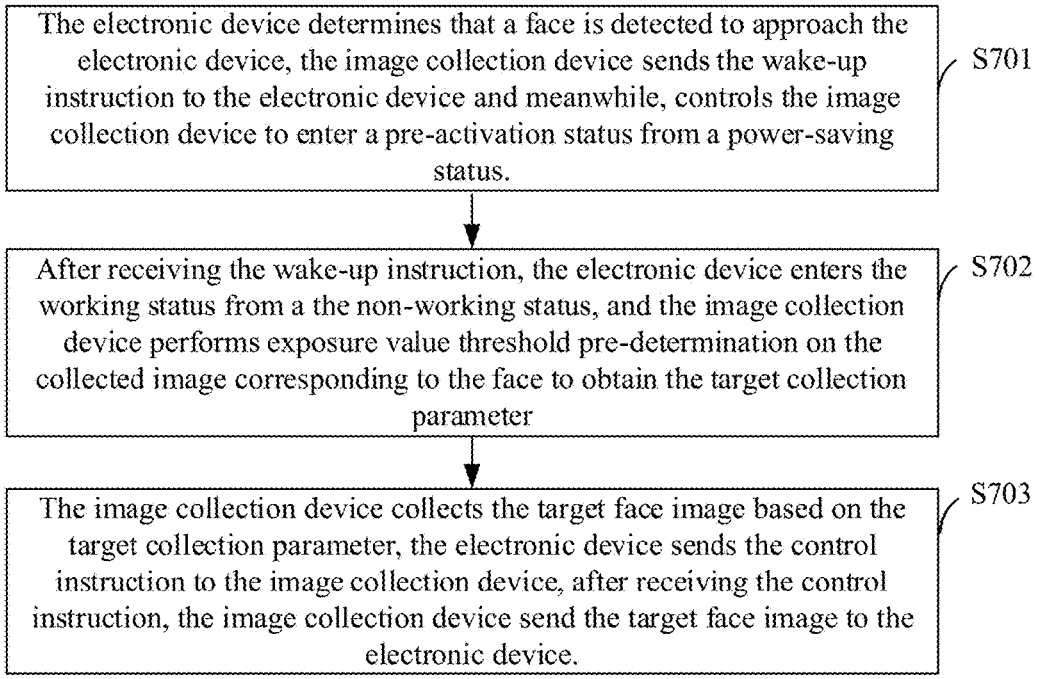
FIG. 5 illustrates a schematic flowchart of a hot start of a face login method based on an image collection device according to some embodiments of the present disclosure.

In some embodiments, FIG. 5 illustrates a schematic flowchart of a hot start of a face login method based on an image collection device according to some embodiments of the present disclosure. The method includes step S701 to step S703.

At S701, a face (i.e., target object) approaching the electronic device is determined to be detected. The image collection device (i.e., target detection unit) sends the wake-up instruction (i.e., status switch instruction) to the electronic device. Meanwhile, the image collection device is controlled to enter a pre-activation status (i.e., second status) from a power-saving status (first status).

In some embodiments, the image collection device can be configured to detect the human object around the electronic device. When the image collection device detects a human object, the image collection device can be in the power-saving status. When the image collection device detects the human face, the wake-up instruction can be sent to the electronic device, and meanwhile, the image collection device can enter the pre-activation status from the power-saving status. When the image collection device enters the pre-activation status from the power-saving status, the power consumption of the image collection device can be increased.

Figure 6:
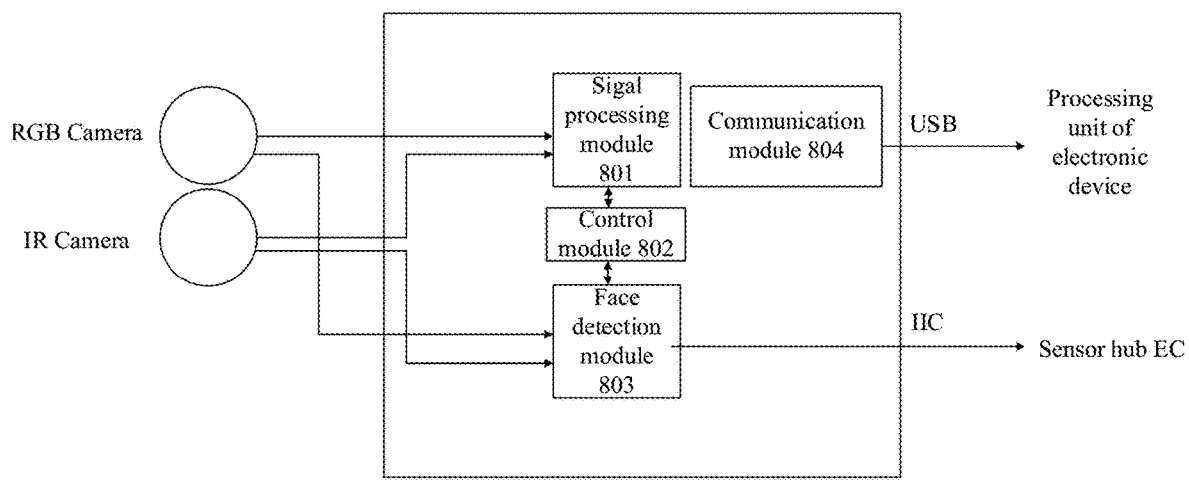
FIG. 6 illustrates a schematic structural diagram of an image collection device according to some embodiments of the present disclosure.

In some embodiments, the image collection device can be integrated into an electronic device. The image collection device can be an infrared (IR) camera or an RGB camera. A plurality of functional modules are integrated into the image collection device. As shown in FIG. 6, the image collection device 800 includes a signal processing module 801, a control module 802, a face detection module 803, and a communication module 804. The signal processing module 801 can be an image signal processing (ISP) module, the control module 802 can be a CPU, the face detection module 803 can be an artificial intelligence human present detection (AI HPD) system, and the communication module 804 can be a universal serial bus (USB) control module. In practical applications, the face detection module 803 can be configured to detect a human face around the electronic device and send a wake-up instruction to the electronic device. The signal processing module 801 can be configured to pre-process the face image collected by the image collection device, e.g., image enhancement and denoising. The control module 802 can be configured to control a processing order of the signal processing module and the face detection module. The communication module 804 can be configured to send the face image collected by the image collection device to the electronic device.

Figure 7:
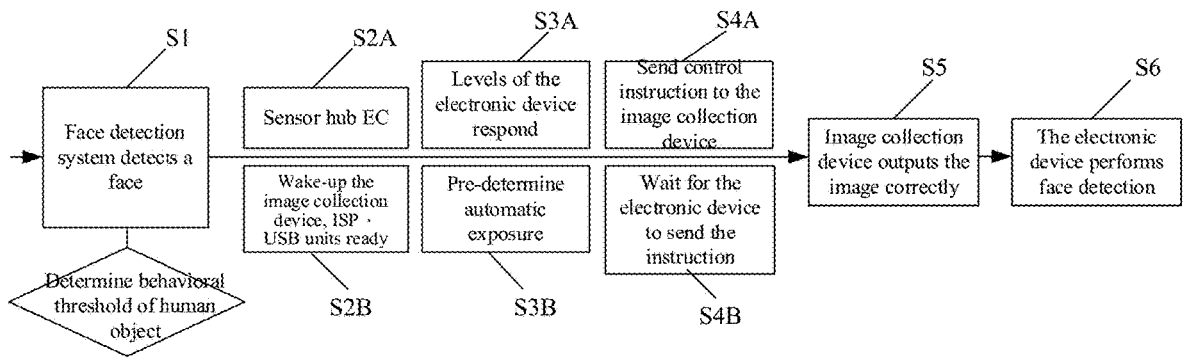
FIG. 7 illustrates a schematic diagram showing a time sequence of a hot start of a face login method based on an image collection device according to some embodiments of the present disclosure.

In some embodiments, FIG. 7 illustrates a schematic diagram showing a time sequence of a hot start of a face login method based on the image collection device according to some embodiments of the present disclosure. In step S1, when AI HPD detects a human object approaching, step S2A is performed to send a sensor hub EC to the electronic device. Meanwhile, step S2B is performed to control the image collection device to enter a pre-activation status. The ISP module and USB module of the image collection device enter a ready status.

At S902, after receiving the wake-up instruction, the electronic device enters a working status (fourth status) from a non-working status (third status), and the image collection device performs pre-determination on a collected exposure value threshold corresponding to the human face to obtain the target collection parameter.

In some embodiments, the wake-up instruction can be a sensor hub EC). As shown in FIG. 7, when the electronic device receives the sensor hub EC sent by the camera, the electronic device performs step S3A. Systems of all levels of the electronic device can respond and enter the working status from the non-working status, e.g., from a sleep or hibernate status to an active status. Meanwhile, the electronic device can also perform step S3B. The ISP module of the camera can perform pre-determination on the exposure value of the face image collected by the camera, compare the brightness value of the collected face image with the predetermined brightness value, and determine the exposure value when the face image of the pre-determined brightness value is collected as the target collection parameter. The predetermined brightness value can be the brightness value of the image that meets the face detection requirement.

In some embodiments, if the image collection device includes the AI HPD, the image collection device can, in the pre-activation status, pre-determine the related parameter of the image brightness in the actual scene that meets the face detection requirement. The related parameter can be the exposure value (target image feature value) corresponding to the image brightness. In other embodiments, if the image collection device does not include the AI HPD, the image collection device can perform the pre-determination on the exposure value after the image collection device is activated according to the first frame of the face image or the face image frame generated at a first time.

At S903, the image collection device collects the target face image based on the target collection parameter, the electronic device sends a control instruction to the image collection device, and after receiving the control command, the image collection device sends the target face image to the electronic device.

In some embodiments, after the target collection parameter is obtained, the target face image can be collected based on the target collection parameter, or the face image corresponding to the predetermined brightness value can be determined as the target face image. Then, step S4A shown in FIG. 7 is performed. The electronic device can send the control instruction to the image collection device, while the image collection device can also wait for the control instruction sent by the electronic device. That is, step S4B is performed. After the image collection device receives the control instruction sent by the electronic device, the image collection device can send the target face image to the processing unit of the electronic device via the USB module. That is, step S5 is performed. Then, step S6 is performed. The processing unit of the electronic device performs the recognition on the target face image. That is, the electronic device performs the recognition on the target object image based on the object feature. After the successful recognition, the electronic device can be logged in.

In the embodiments disclosed in the present disclosure, by introducing the face detection system, face detection can be performed before the image collection device is activated. After the image collection device enters the pre-activation status, the ambient light can be detected, and the exposure value can be pre-determined. Thus, after receiving the control instruction sent by the electronic device, the image collection device can directly output a correctly exposed face image, thereby reducing the waiting time to log into the electronic device.

Figure 8:
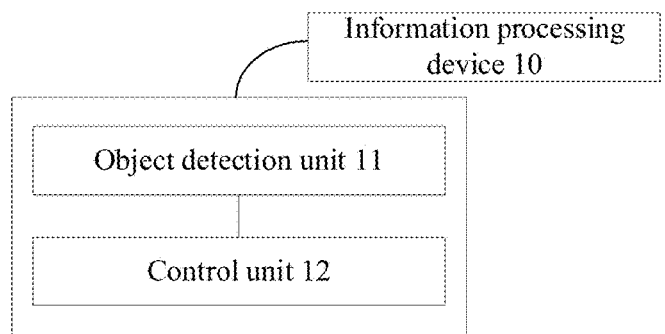
FIG. 8 illustrates a schematic structural diagram of an information processing device according to some embodiments of the present disclosure.

The present disclosure also provides an information processing device. FIG. 8 illustrates a schematic structural diagram of an information processing device 10 according to some embodiments of the present disclosure. As shown in FIG. 8, the information processing device 10 includes an object detection unit 11 and a control unit 12.

The object detection unit 11 can be configured to determine that the target object is detected, send the status switch instruction to the control unit 12, and control the object detection unit 11 to switch from the first status to the second status. The status switch instruction can be used to cause the electronic device to be switched from the third status to the fourth status.

The control unit 12 can be configured to send the control instruction to the object detection unit 11.

In some embodiments, the object detection unit 11 can also be configured to determine that the object detection unit 11 enters the second status, obtain the object feature of the target object in response to the control instruction sent by the control unit 12 to cause the electronic device to perform the recognition on the target object based on the object feature.

The description of the information processing device of embodiments of the present disclosure is similar to the description of method embodiments of the present disclosure and has similar beneficial effects as method embodiments, which are not repeated here. For technical details not described in device embodiments, reference can be made to the description of method embodiments of the present disclosure.

In embodiments of the present disclosure, if the control method is implemented in the form of software functional modules and sold or used as an independent product, the control method can also be stored in a computer-readable storage medium. Thus, the essential part or the part that contributes to the related solutions in the technical solution of embodiments of the present disclosure can be embodied in the form of a computer software product. The computer software product is stored in a storage medium and includes instructions that cause a computer device (such as a personal computer, server, or network device) to perform all or a part of the method of embodiments of the present disclosure. The storage medium can include various media capable of storing program code, such as a USB flash drive, a portable hard drive, a read-only memory (ROM), a magnetic disc, or an optical disc. Thus, embodiments of the present disclosure are not limited to any specific combination of hardware and software.

Similarly, embodiments of the present disclosure provide a computer-readable storage medium, which stores a computer program. When the computer program is executed by a processor, the information processing method of embodiments of the present disclosure can be implemented.

Figure 9:
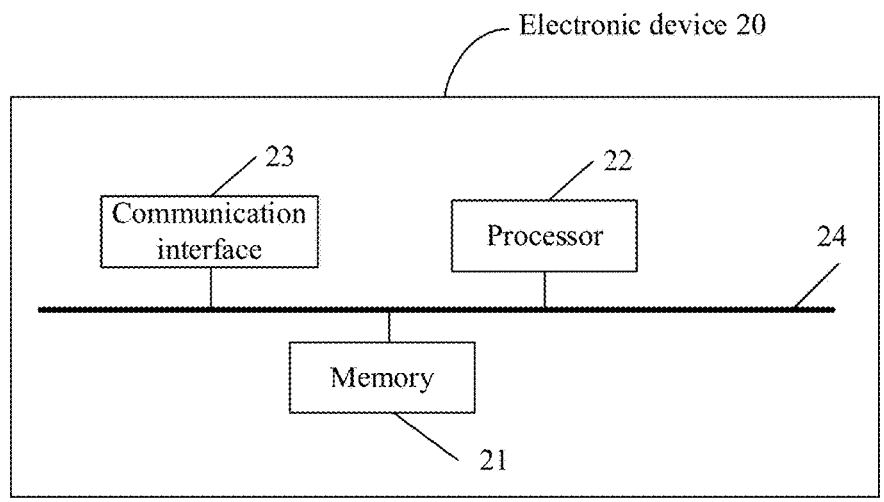
FIG. 9 illustrates a schematic structural diagram of an electronic device according to some embodiments of the present disclosure.

Furthermore, embodiments of the present disclosure provide an electronic device. FIG. 9 illustrates a schematic structural diagram of an electronic device 20 according to some embodiments of the present disclosure. As shown in FIG. 9, the electronic device 20 includes a memory 21, a processor 22, a communication interface 23, and a communication bus 24. The memory 21 can be used to store executable information processing instructions. The processor 22 can be configured to execute the executable information processing instructions stored in the memory to implement the information processing method of embodiments of the present disclosure.

The descriptions of electronic device and storage medium embodiments are similar to the description of method embodiments of the present disclosure and have similar beneficial effects. For technical details not described in electronic device and storage medium embodiments, reference can be made to the description of method embodiments of the present disclosure.

In the present disclosure, the terms "comprise," "include," or any variations thereof are intended to encompass non-exclusive inclusion, such that a process, method, article, or device comprising a series of elements includes not only those elements but also other elements not explicitly listed, or includes additional elements inherent to such process, method, article, or device. Unless otherwise specified, the elements limited by the phrase "including at least one . . . " do not exclude the presence of additional identical elements in the process, method, article, or device that includes the elements.

In some embodiments of the present disclosure, the device and method can be implemented in other manners. Device embodiments are only illustrative. For example, the division of the unit is only a logical functional division, and other division manners can be used in actual implementation. For example, a plurality of units or assemblies can be combined or integrated into another system, or some features can be ignored or not executed. In addition, the coupling, direct coupling, or communication connection between various components shown or discussed can be indirect coupling or communication connection of the device or units through some interfaces and can be electrical, mechanical, or another form.

The units described as separate components can be physically separated or not. The components shown as separate units can be or cannot be physical units and can be located in one place or distributed among a plurality of network units. Some or all of the units can be selected to achieve the purpose of embodiments of the present disclosure according to actual needs.

Furthermore, the functional units of embodiments of the present disclosure can be integrated in a processing unit, or can be regarded as separate units. In some embodiments, two or more units can also be integrated into one unit. The integrated unit can be implemented in hardware, or in the form of a hardware and software functional unit.

Those skilled in the art can understand that all or a part of steps of method embodiments can be implemented using hardware associated with program instructions. The program can be stored in a computer-readable storage medium, and when executed, the steps of method embodiments can be performed. The storage medium can include various media capable of storing program code, such as a mobile storage device, a ROM, a magnetic disk, or an optical disc.

In some other embodiments, if the integrated unit of the present disclosure is implemented as a software functional module and sold or used as an independent product, the integrated unit can also be stored in a computer-readable storage medium. Based on this understanding, the essence or the part that contributes to the existing technology of the technical solution of embodiments of the present disclosure can be embodied in the form of the software product. The computer software product can be stored in a storage medium and includes some instructions to cause the product to perform all or a part of the method of embodiments of the present disclosure. The storage medium can include various media capable of storing program code, such as a mobile storage device, a ROM, a magnetic disk, or an optical disk.

The above description is only embodiments of the present disclosure. However, the scope of the present disclosure is not limited to this. Those skilled in the art can easily think of variations or replacements within the technical scope of the present disclosure. The variations or replacements should be within the scope of the present disclosure. Therefore, the scope of the present invention should be subjected to the claims.

What is claimed is:

1. An information processing method, applied to an electronic device including an object detection unit and a control unit, comprising:
    determining that a target object is detected, wherein the object detection unit sends a status switch instruction to the control unit and controls the object detection unit to switch from a first status to a second status, and the status switch instruction is used to cause the electronic device to switch from a third status to a fourth status; and
    determining that the object detection unit enters the second status, wherein in response to a control instruction from the control unit, the object detection unit obtains an object feature of the target object to cause the electronic device to recognize the target object based on the object feature.

2. The method according to claim 1, further comprising:
    determining that the object detection unit is currently in the first status and detecting an object within a predetermined range around the electronic device; and
    determining that the target object is detected within the predetermined range around the electronic device, sending the status switch instruction to the control unit, and controlling the object detection unit to enter the second status from the first status.

3. The method according to claim 1, further comprising:
    determining that the object detection unit has entered the second status, wherein the object detection unit determines a target collection parameter corresponding to the target object;
    collecting a target image frame corresponding to the target object based on the target collection parameter;
    sending the target image frame to the control unit by the object detection unit; and
    obtaining an object feature of the target object from the target image frame by the control unit, performing recognition on the target object based on the object feature, and logging into the electronic device after successful recognition.

4. The method according to claim 3, wherein determining the target collection parameter corresponding to the target object by the object detection unit includes:
    collecting an initial image frame corresponding to the target object by the object detection unit, determining an initial image feature value corresponding to the object detection unit when collecting the initial image frame;
    determining a feature value corresponding to the initial image frame, and determining a target scene corresponding to the target object in the initial image frame based on the feature value;
    determining a target image feature gain value corresponding to the target scene based on a correspondence between the scene and the image feature gain value; and
    determining the target image feature value based on the initial image feature value and the target image feature gain value, and determining the target image feature value as the target collection parameter corresponding to the target object.

5. The method according to claim 4, wherein determining the feature value corresponding to the initial image frame and determining the target scene corresponding to the target object in the initial image frame based on the feature value includes:
    dividing the initial image frame to obtain at least two image blocks and determining a region feature value corresponding to each image block of the at least two image blocks;
    determining a feature level corresponding to the image block based on the region feature value corresponding to the image block;
    determining feature variation information of the initial image frame based on the feature level of the image block; and determining the target scene corresponding to the target object in the initial image frame based on the feature variation information.

6. The method according to claim 1, wherein determining that the target object is detected includes:
   determining that a first object having a distance to the electronic device smaller than a first distance threshold exists, and obtaining at least two first image frames corresponding to the first object;
   determining distances between the first object and the electronic device and timestamps corresponding to the at least two first image frames when collecting the at least two first image frames;
   arranging the distances in an ascending order of the timestamps of the first image frames corresponding to the distances to obtain an arrangement result of the distances; and
   determining that the distances change according to a predetermined rule based on the arrangement result, a first distance being smaller than or equal to a second distance threshold, and determining that the target object is detected, the first distance being a last distance in the arrangement result.

7. The method according to claim 1,
   wherein the object detection unit further includes a first detection unit and a second detection unit;
   determining that the target object is detected, sending the status switch instruction to the control unit by the object detection unit, and controlling the object detection unit to switch from the first status to the second status include:
      determining that the first detection unit detects the target object, sending the status switch instruction to the control unit by the first detection unit, and controlling the second detection unit to switch from the first status to the second status.

8. The method according to claim 1, further comprising:
   determining that no target object is detected within a predetermined time, controlling the object detection unit to stop working, and performing detection on an object within the predetermined range around the electronic device at an interval of a predetermined time length; and
   determining that the object detection unit detects the target object, sending the status switch instruction to the control unit by the object detection unit, and controlling the object detection unit to switch from the first status to the second status.

9. An information processing device, comprising an object detection unit and a control unit, wherein:
   the object detection unit is configured to determine that a target object is detected, send a status switch instruction to the control unit, and control the object detection unit to switch from a first status to a second status, the status switch instruction being used to cause an electronic device to switch from a third status to a fourth status;
   the control unit is configured to send a control instruction to the object detection unit; and
   the object detection unit is further configured to determine that the object detection unit enters the second status, and in response to the control instruction from the control unit, obtain an object feature of the target object to cause the electronic device to perform recognition on the target object based on the object feature.

10. The device according to claim 9, wherein the object detection unit is further configured to:
    determine that the object detection unit is currently in the first status and detect an object within a predetermined range around the electronic device; and
    determine that the target object is detected within the predetermined range around the electronic device, send the status switch instruction to the control unit, and control the object detection unit to enter the second status from the first status.

11. The device according to claim 9, wherein the object detection unit is further configured to:
    determine that the object detection unit has entered the second status, wherein the object detection unit determines a target collection parameter corresponding to the target object;
    collect a target image frame corresponding to the target object based on the target collection parameter;
    send the target image frame to the control unit by the object detection unit; and
    obtain an object feature of the target object from the target image frame by the control unit, perform recognition on the target object based on the object feature, and log into the electronic device after successful recognition.

12. The device according to claim 11, wherein the object detection unit is further configured to:
    collect an initial image frame corresponding to the target object by the object detection unit, and determine an initial image feature value corresponding to the object detection unit when collecting the initial image frame;
    determine a feature value corresponding to the initial image frame, and determine a target scene corresponding to the target object in the initial image frame based on the feature value;
    determine a target image feature gain value corresponding to the target scene based on a correspondence between the scene and the image feature gain value; and
    determine the target image feature value based on the initial image feature value and the target image feature gain value, and determine the target image feature value as the target collection parameter corresponding to the target object.

13. The device according to claim 12, wherein the object detection unit is further configured to:
    divide the initial image frame to obtain at least two image blocks and determine a region feature value corresponding to each image block of the at least two image blocks;
    determine a feature level corresponding to the image block based on the region feature value corresponding to the image block;
    determine feature variation information of the initial image frame based on the feature level of the image block; and
    determine the target scene corresponding to the target object in the initial image frame based on the feature variation information.

14. An electronic device, comprising:
    one or more processors; and
    one or more memories storing executable information processing instructions that, when executed by the one or more processors, cause the one or more processors to:
       determine that a target object is detected, send a status switch instruction, and control an object detection unit to switch from a first status to a second status, the status switch instruction being used to cause the electronic device to switch from a third status to a fourth status; and determine that the object detection unit enters the second status, and in response to a control instruction, obtain an object feature of the target object to cause the electronic device to perform recognition on the target object based on the object feature.

15. The device according to claim 14, wherein the one or more processors are further configured to:
   determine that the object detection unit is currently in the first status and detect an object within a predetermined range around the electronic device; and
   determine that the target object is detected within the predetermined range around the electronic device, send the status switch instruction to the control unit, and control the object detection unit to enter the second status from the first status.

16. The device according to claim 14, wherein the one or more processors are further configured to:
   determine that the object detection unit has entered the second status, and determine a target collection parameter corresponding to the target object;
   collect a target image frame corresponding to the target object based on the target collection parameter;
   send the target image frame; and
   obtain an object feature of the target object from the target image frame, and perform recognition on the target object based on the object feature, and log into the electronic device after successful recognition.

17. The device according to claim 16, wherein the one or more processors are further configured to:
   collect an initial image frame corresponding to the target object, determine an initial image feature value corresponding to the object detection unit when collecting the initial image frame;
   determine a feature value corresponding to the initial image frame, and determine a target scene corresponding to the target object in the initial image frame based on the feature value;
   determine a target image feature gain value corresponding to the target scene based on a correspondence between the scene and the image feature gain value; and
   determine the target image feature value based on the initial image feature value and the target image feature gain value, and determine the target image feature value as the target collection parameter corresponding to the target object.

18. The device according to claim 17, wherein the one or more processors are further configured to:
   divide the initial image frame to obtain at least two image blocks and determine a region feature value corresponding to each image block of the at least two image blocks;
   determine a feature level corresponding to the image block based on the region feature value corresponding to the image block;
   determine feature variation information of the initial image frame based on the feature level of the image block; and
   determine the target scene corresponding to the target object in the initial image frame based on the feature variation information.

19. The device according to claim 14, wherein the one or more processors are further configured to:
   determine that a first object having a distance to the electronic device smaller than a first distance threshold exists, and obtain at least two first image frames corresponding to the first object;
   determine distances between the first object and the electronic device and timestamps corresponding to the at least two first image frames when collecting the at least two first image frames;
   arrange the distances in an ascending order of the timestamps of the first image frames corresponding to the distances to obtain an arrangement result of the distances; and
   determine that the distances changes according to a predetermined rule based on the arrangement result, a first distance being smaller than or equal to a second distance threshold, and determine that the target object is detected, the first distance being a last distance in the arrangement result.

20. The device according to claim 14, wherein the one or more processors are further configured to:
   determine that a first detection unit detects the target object, send the status switch instruction to the control unit by the first detection unit, and control a second detection unit to switch from the first status to the second status.

* * * * *